(No Model.)
A. W. CRAM.
TIME CLOSING VALVE FOR WATER CLOSETS.
No. 380,619. Patented Apr. 3, 1888.
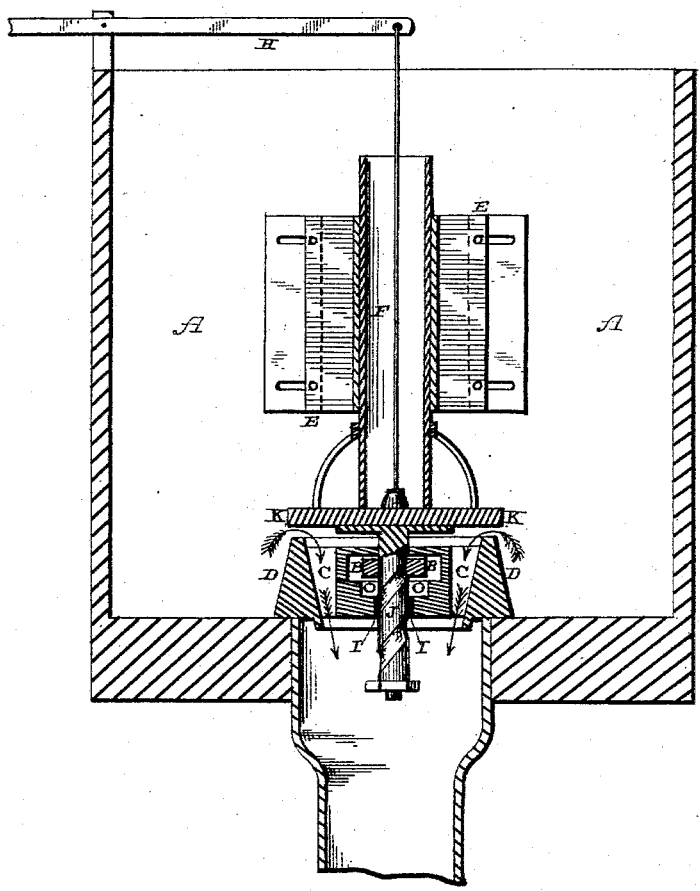

UNITED STATES PATENT OFFICE.

ALONZO W. CRAM, OF HAVERHILL, MASSACHUSETTS.

TIME CLOSING-VALVE FOR WATER-CLOSETS.

SPECIFICATION forming part of Letters Patent No. 380,619, dated April 3, 1888.

Application filed June 27, 1887. Serial No. 242,648. (No model.)

*To all whom it may concern:*

Be it known that I, ALONZO W. CRAM, of Haverhill, in the county of Essex and State of Massachusetts, have invented certain new and useful Improvements in Time Closing-Valves for Water-Closets; and I do hereby declare the following to be a full, clear, and exact description of the invention, such as will enable others skilled in the art to which it pertains to make and use it, reference being had to the accompanying drawing, which forms part of this specification.

My invention relates to an improvement in time closing-valves for water-closets; and it consists in the combination of the overflow-pipe provided with adjustable wings, a valve which is connected to the lower end of the pipe, the valve-seat, a coarse-threaded screw which is secured to the under side of the valve, a nut which fits upon the screw, and the seat for the nut, as will be more fully described hereinafter.

The object of my invention is to provide a time closing-valve in which the rotation of the valve in the water is retarded by the wings which are attached to the overflow-pipe, and thus regulate the time it will take for the valve to close.

The accompanying drawing represents an apparatus embodying my invention partly in section.

A represents the tank, and D the valve-seat provided with suitable openings or passages, C, for the water, which passages are located to one side of the center of the seat. Through the center of this valve-seat is formed an opening, I, through which the coarse-threaded screw J has a free vertical movement. In the center of the seat is formed the recess O, which forms a seat for the nut B, which engages with the thread J, as shown, and prevents the screw from sinking downward while the nut is upon its seat O without revolving. When the screw J and the valve K, which control the flow of the water through the passages C, the overflow-pipe F, and the wings, are raised upward by the operating-lever H, the nut B is raised from its seat O at the same time that the valve K on the lower end of the overflow-pipe F opens the passages C for the escape of the water. The overflow-pipe F extends upward any suitable distance in the tank, and has both the valve K and the coarse screw J rigidly secured to its lower end. Secured to the sides of this pipe F are any desired number of wings, E, which are made in sections, and the outer sections are slotted, so that they can be adjusted laterally upon the inner sections, which are rigidly secured to the pipe. These wings E serve to retard the rotation of the pipe F and valve K by contact with the water, and are made adjustable, as shown, so that the time of the closing of the valve can be regulated at will. When the wings E are extended to their full extent, they retard the rotation of the pipe F and valve K to a greater extent than they do when the outer sections of the wings are forced inward, and hence the valve sinks more slowly and allows a greater quantity of water to escape through the passages C. When the lever H is raised upward, the nut B, which is of any desired shape, is lifted from its seat O, so that it will not be confined, and will turn around and allow the screw A to go up through it without turning. When the lever H is released, the nut B instantly drops into its seat O, and then the screw J, valve K, and pipe F, provided with wings, cannot sink downward without revolving. As the revolution of the screw-valve K and pipe F is retarded by the action of the wings E upon the water, the time for the closing of the valve is regulated at will.

A nut is here shown in connection with the screw; but I do not limit myself to this construction. A dog or any equivalent device may be used in place of the screw and made to catch in the same manner. This screw is here shown in the center of the flange; but this location is not necessary, as it will operate equally as well if placed to one side of the center.

Having thus described my invention, I claim—

1. The combination of the overflow-pipe, the valve connected to its lower end, the screw, and a nut placed upon the screw with the blades, the valve-seat provided with openings for the escape of the water, and the seat for the nut, and the operating-lever, substantially as shown.

2. The combination of the operating-lever, the tank, the overflow-pipe F, provided with wings, the valve K, secured to the lower end of the pipe, the coarse-threaded screw J, and the valve-seat D, placed in the bottom of the tank, provided with openings C and seat O, and the nut B, placed in an opening in the valve-seat, substantially as set forth.

3. The combination of the tank, the valve-seat placed in the bottom of the tank and provided with passages for the escape of the water, and an opening through its center, the coarse-threaded screw which passes through the opening in the valve-seat, the valve secured to the overflow-pipe and the screw, and a nut placed in a recess in the seat and through which the screw passes, substantially as specified.

In testimony whereof I affix my signature in presence of two witnesses.

ALONZO W. CRAM.

Witnesses:
M. S. CROSBY,
W. D. CRAM.